United States Patent
Hung et al.

(10) Patent No.: US 8,174,971 B2
(45) Date of Patent: May 8, 2012

(54) NETWORK SWITCH

(75) Inventors: Ming Hung, Cupertino, CA (US);
Weidong Liu, Sunnyvale, CA (US)

(73) Assignee: Lantiq Deutschland GmbH, Neubiberg (DE)

( * ) Notice: Subject to any disclaimer, the term of this patent is extended or adjusted under 35 U.S.C. 154(b) by 1011 days.

(21) Appl. No.: 11/650,863

(22) Filed: Jan. 8, 2007

(65) Prior Publication Data

US 2007/0201360 A1    Aug. 30, 2007

Related U.S. Application Data

(63) Continuation of application No. 09/625,664, filed on Jul. 26, 2000, now Pat. No. 7,161,938.

(51) Int. Cl.
*H04J 3/14*    (2006.01)
(52) U.S. Cl. .................................. 370/230; 370/235
(58) Field of Classification Search .................. 370/235, 370/13, 229, 389, 230, 395; 709/229
See application file for complete search history.

(56) References Cited

U.S. PATENT DOCUMENTS

| | | | | | |
|---|---|---|---|---|---|
| 5,313,454 | A | * | 5/1994 | Bustini et al. | 370/231 |
| 6,061,330 | A | * | 5/2000 | Johansson | 370/229 |
| 6,067,298 | A | * | 5/2000 | Shinohara | 370/395.71 |
| 6,144,635 | A | * | 11/2000 | Nakagawa | 370/229 |
| 6,226,265 | B1 | * | 5/2001 | Nakamichi et al. | 370/235 |
| 6,252,849 | B1 | * | 6/2001 | Rom et al. | 370/230 |
| 6,570,876 | B1 | * | 5/2003 | Aimoto | 370/389 |
| 6,725,270 | B1 | * | 4/2004 | Yu et al. | 709/229 |
| 6,907,001 | B1 | * | 6/2005 | Nakayama et al. | 370/230 |

* cited by examiner

*Primary Examiner* — Kwang B Yao
*Assistant Examiner* — Syed M Bokhari
(74) *Attorney, Agent, or Firm* — Eschweiler & Associates, LLC

(57) ABSTRACT

A network switch includes a media access controller (MAC) coupled to a plurality of ports, a receiver coupled to the MAC, and packet queuing control (PQC) coupled to the receiver. The PQC is configured to maintain a count of the number of receive packets stored in the receiver in each of a plurality of input buffers, each input buffer associated with one of the plurality of ports coupled to the MAC. The network switch also includes at least one output buffer operably connected to the input buffers.

17 Claims, 13 Drawing Sheets

NETWORK SWITCH

FIELD OF THE INVENTION

This invention relates generally to the field of network transactions. More particularly, the invention relates to networking switches.

BACKGROUND

In recent years, local area networks (LANs) have become customary in various environments such as offices. Crucial components of LANs are network switches. Network switches redirect data received from a multitude of network nodes (or stations) to other stations via various connected ports. High-end switches typically need to reach a particular wire speed for the transmission of traffic patterns. Operating at an optimal wire speed increases switch efficiency and networking bandwidth. Logically, there is a strong motivation by users and manufacturers of network switches to continuously increase network efficiency and bandwidth. Therefore, what is desired is a system and method for a more efficient network switch.

SUMMARY

According to one embodiment, a method is disclosed. The method includes receiving a data packet at a receiver of a network switch from a first port coupled to the receiver and transmitting a first signal from the receiver to a packet queuing control. In addition, the method includes determining whether the number of data packets received from the first port that are waiting to be serviced exceed a predetermined threshold. If the number of data packets waiting to be serviced exceed the predetermined threshold, the method includes transmitting a second signal from the network switch to a station coupled to the network switch indicating that the station terminate the transmission of data packets to the network switch.

BRIEF DESCRIPTION OF THE DRAWINGS

A better understanding of the present invention can be obtained from the following detailed description in conjunction with the following drawings, in which.

DETAILED DESCRIPTION

A network switch is described. In the following detailed description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Network Architecture

Figure 1:
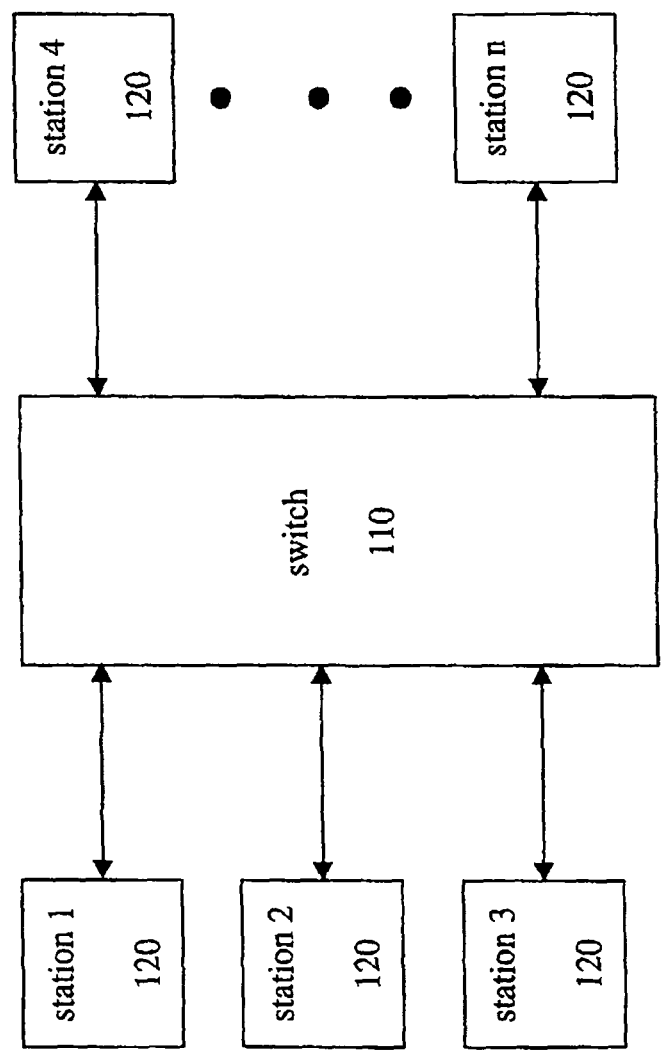
FIG. 1 is a block diagram of one embodiment of a network.

FIG. 1 is a block diagram of one embodiment of a network 100. Network 100 includes a network switch 110 and a plurality of network stations 120 coupled via communication paths. Network 100 is a data communications system that allows a number of independent devices to communicate within a predetermined geographic area. According to one embodiment, network 100 is an Ethernet local area network (LAN). However, one of ordinary skill in the art will recognize that network 100 may be implemented in other packet switched networks.

In operation, switch 110 redirects data received from a station 120 via a connected port to another station 120 via a different port. Network stations 120 are nodes on network 100 that run user application programs. Each station 120 transmits messages to other stations 120 via switch 110. Typically, each message may be broken into well defined elements, called packets, which may be independently transmitted from a source station 120 to a destination station 120. Each packet may generally include a packet header, with information relating to transmission and routing, and a packet body, with the data to be transmitted. The header includes control information such as the address of the originating and destination stations 120.

Switch Architecture

Figure 2:
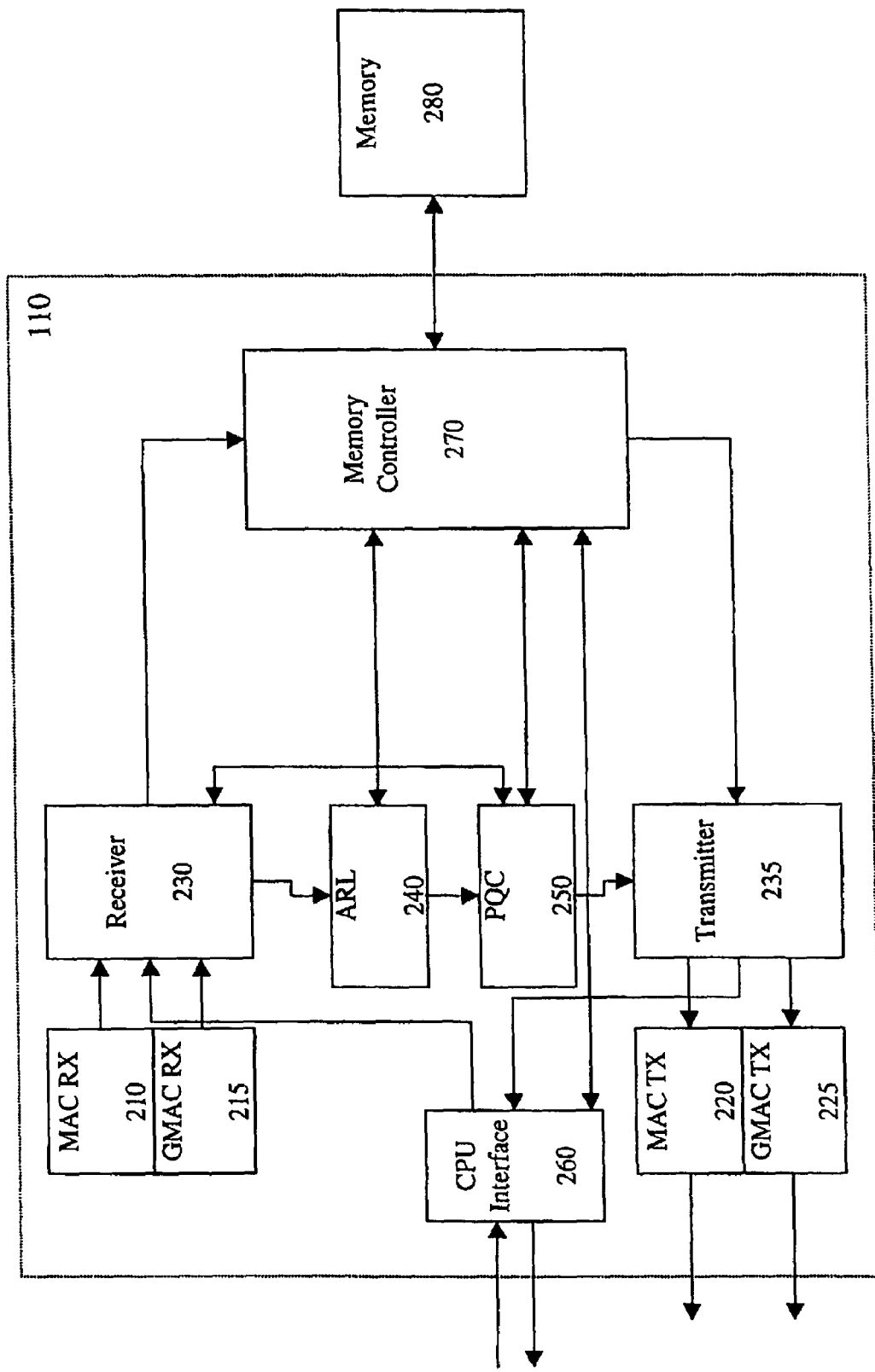
FIG. 2 is a block diagram of one embodiment of a network switch.

FIG. 2 is a block diagram of one embodiment of switch 110 coupled to a memory 280. Switch 110 includes media access controllers (MACs) 210 and 220, and gigabit MACs 215 and 225. Receive MAC 210 and GMAC 215 receive input traffic transmitted from network stations 120. The input traffic is received from network lines coupled to ports at switch 110. Transmit MAC 220 and GMAC 225 transmit packets of data to designated stations 120 via ports attached to network lines. According to one embodiment, receive MAC 210 and transmit MAC 220 each include 24 fast Ethernet ports. In addition, receive GMAC 215 and transmit MAC 225 include 2 one-gigabit Ethernet ports. However, one of ordinary skill in the art will appreciate that other MAC and GMAC configurations may be implemented.

Figure 3B:
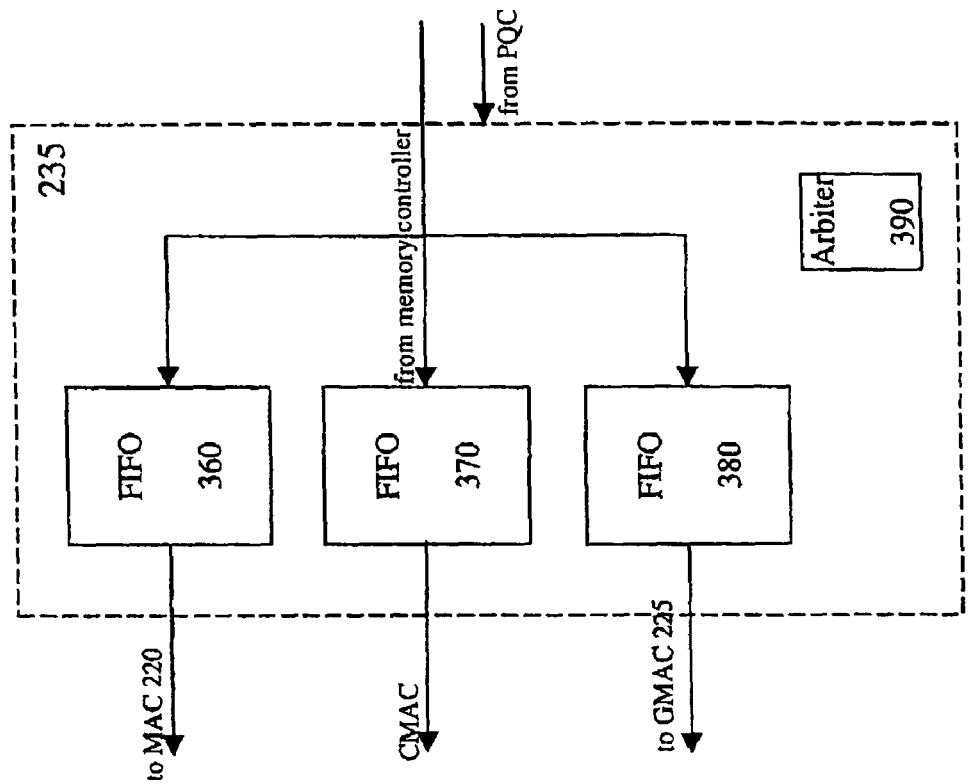
FIG. 3b is a block diagram of one embodiment of a transmitter.
Figure 3A:
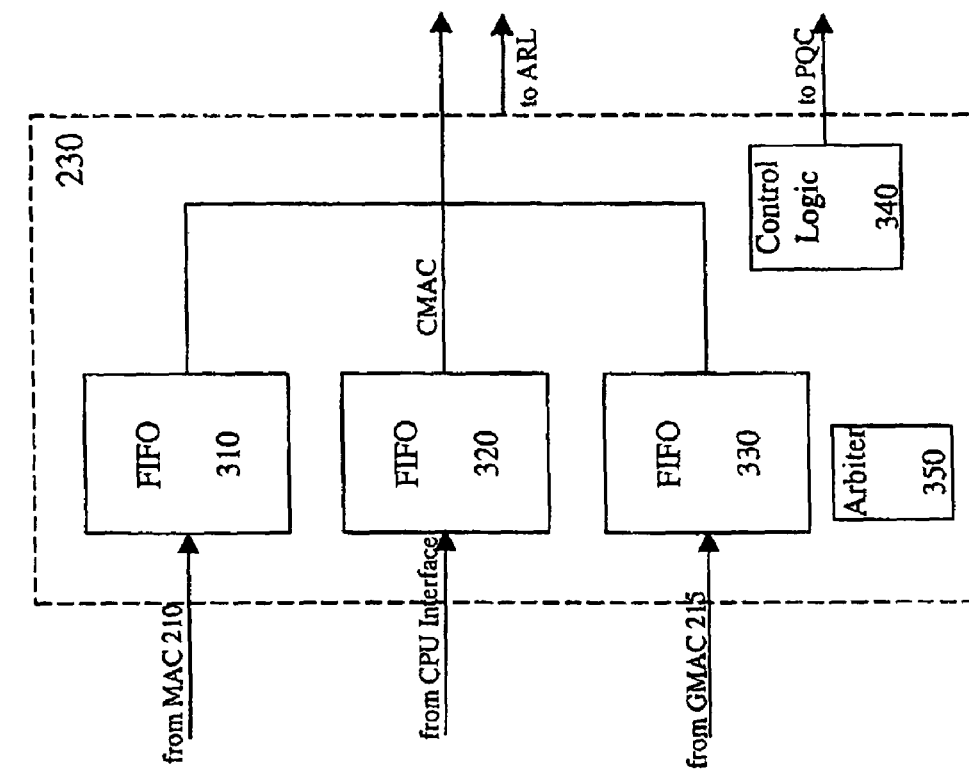
FIG. 3a is a block diagram of one embodiment of a receiver.

Switch 110 also includes receiver 230 and transmitter 235. Receiver 230 is coupled to MAC 210 and GMAC 215. Receiver 230 receives data traffic from MACs 210 and GMAC 215 for transmission to memory. FIG. 3a is a block diagram of one embodiment of receiver 230. Referring to FIG. 3a, receiver 230 includes first-in-first-out (FIFO) buffers 310, 320, and 330, control logic 340 and arbiter 350. Each of the FIFO buffers store data traffic received from the network lines and a CPU interface.

According to one embodiment, FIFO 310 receives packets from MAC 210, FIFO 320 receives packets from the CPU interface and FIFO 330 receives packets from GMAC 215. Control logic 340 keeps track of the number of received data packets stored in each FIFO. According to one embodiment, FIFO 310 and FIFO 330 maintain a separate storage location corresponding to each port coupled to MAC 210 and GMAC 215, respectively. Arbiter 350 arbitrates between the three FIFO buffers within receiver 230 in order to determine which will be granted access to memory.

Referring back to FIG. 2, transmitter 235 is coupled to MACs 220 and 225. Transmitter 235 receives packet data from memory and forwards data packets to MACs 220 and 255 for transmission from switch 110 via the network ports. FIG. 3b is a block diagram of one embodiment of transmitter 235. Referring to FIG. 3b, transmitter 235 includes FIFO buffers 360, 370, and 380 and arbiter 390. Each of the FIFO buffers within transmitter 235 store received data packets before the packets are forwarded to MAC 220 or GMAC 225 where they are transmitted from a network port.

According to one embodiment, FIFO 360 forwards data packets to MAC 220, FIFO 370 forwards packets to the CPU interface and FIFO 380 forwards packets to GMAC 225. Similar to the FIFO buffers in receiver 230, transmitter 235 maintains a separate storage location corresponding to each port coupled to MACs 220 and GMAC 225, respectively. Similarly, arbiter 390 arbitrates between the three FIFO buffers within transmitter 235 in order to determine which will be granted access to memory.

Referring back to FIG. 2, switch 110 also includes address resolution logic (ARL) 240 coupled to receiver 230 and memory controller 270. ARL 240 receives and examines the header of each data packet received at switch 110. ARL 240 accesses an address lookup table in memory 280 to determine the port from which a packet is to be transmitted. The address lookup table stores information regarding output ports and destination addresses. For example, each port entry in the lookup table corresponds to one or more destination addresses. The destination address is included in the header of a packet and identifies the station 120 to which the packet data is transmitted.

Figure 8:
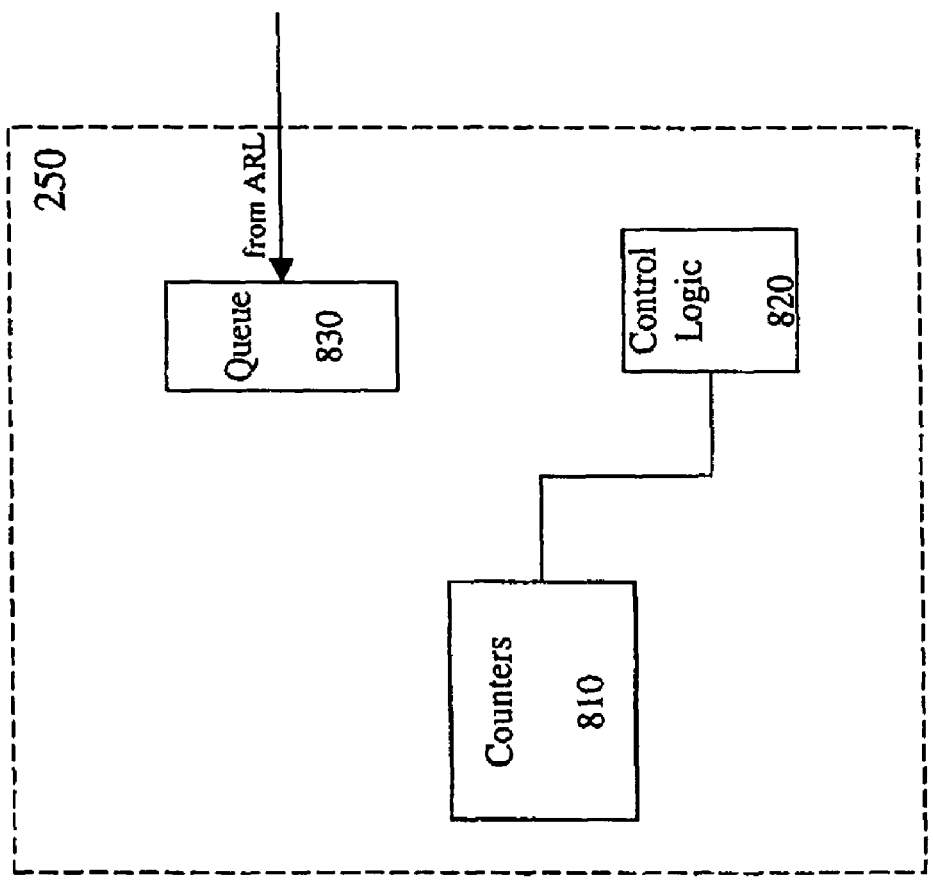
FIG. 8 is a block diagram of one embodiment of a packet queuing control.

In addition, switch 110 includes packet queuing control (PQC) 250 coupled to ARL 240, memory controller 270 and transmitter 235. FIG. 8 is a block diagram of one embodiment of PQC 250. PQC 250 includes counters 810, control logic 820 and queue 830. Counters 810 maintain the count for the number of received data packets stored in FIFO buffers 310 and 330 in receiver 230. Control logic 820 is coupled to counter 810. According to one embodiment, control logic 820 controls the flow of traffic received at switch 110 based upon counters 810. Queue 830 is a queue for all input data packets that are to be transmitted from switch 110 as an output packet. According to one embodiment, queue 830 includes queue storage for each outgoing port connected at MAC 220, GMAC 225 and the CPU interface. The queuing process implemented by PQC 250 will be described in further detail below.

Figure 4:
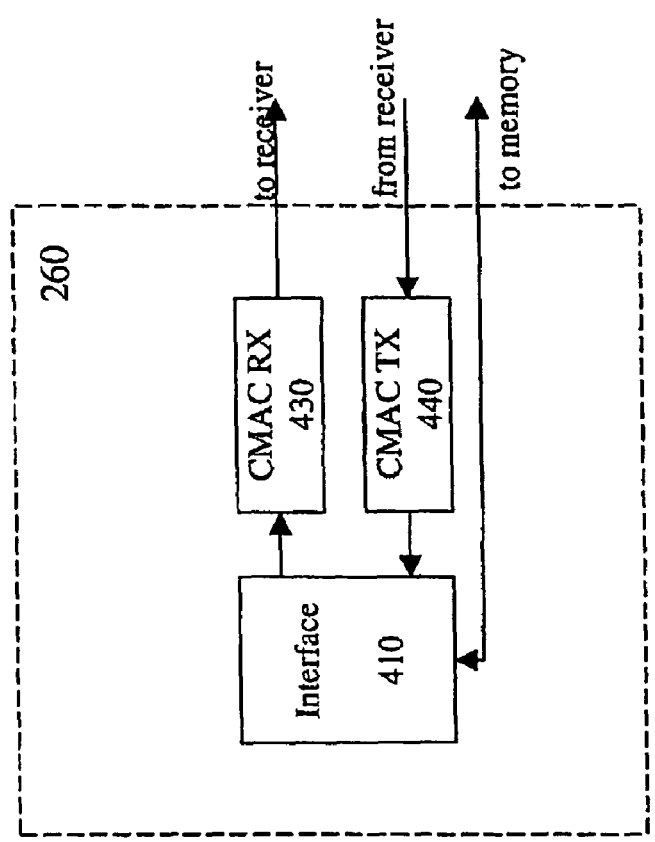
FIG. 4 is a block diagram of one embodiment of a CPU interface.

Referring back to FIG. 2, switch 110 also includes central processing unit (CPU) interface 260 coupled to receiver 230 and transmitter 235. FIG. 4 is a block diagram of CPU interface 260. CPU interface 260 includes interface 410 and CPU master access controllers (CMACs) 430 and 440. Interface 410 interfaces with a CPU (not shown) in order to receive instructions and commands. CMACs 430 and 440 are coupled to interface 410. According to one embodiment, CMACs 430 and 440 implement function similar to MACs 210 and 220 described above. Whenever a CPU attempts to transmit a packet of data via an output port, the packet is transmitted from interface 410 to FIFO 320 at receiver 230 via CMAC 430. Subsequently, the packet is handled in a manner similar to other packet data received at switch 110. Similarly, packet data may be transmitted to a CPU from transmitter 235 via CMAC 440 and interface 410.

Referring back to FIG. 2, switch 110 further includes memory controller 270. Memory controller 270 is coupled to receiver 230, transmitter 235, ARL 240, PQC 250 and CPU interface 260. Memory controller 270 controls the access of memory 280 by receiver 230, transmitter 235, ARL 240, PQC 250 and CPU interface 260.

Figure 6:
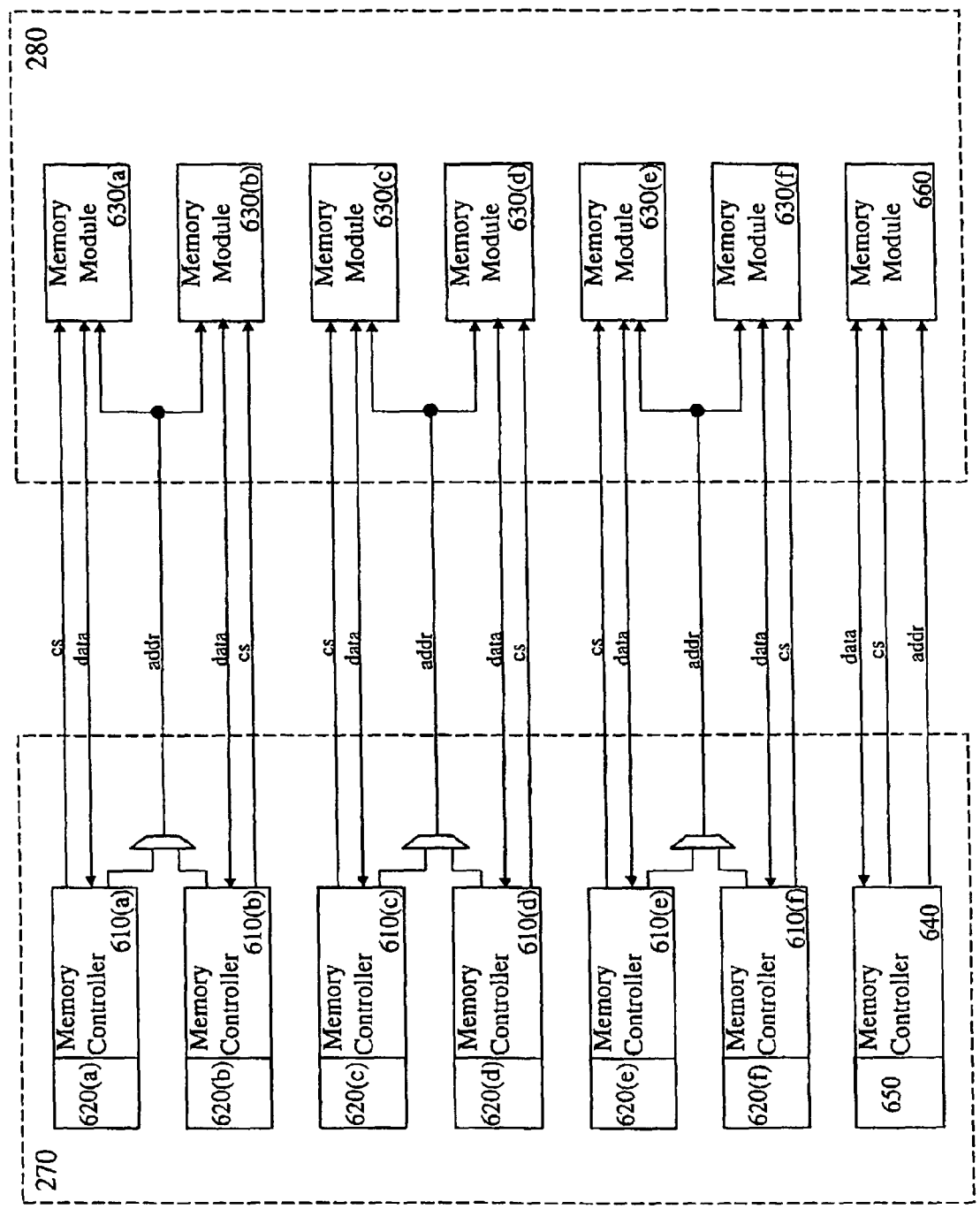
FIG. 6 is a block diagram of one embodiment of a memory controller coupled to a memory.

FIG. 6 is a block diagram of memory controller 270 coupled to memory 280. Memory controller 270 includes memory controllers 610(a)-610(f) coupled to memory modules 630(a)-630(f), respectively, within memory 280. Memory controllers 610(a)-610(f) include arbiters 620(a)-620(f), respectively. The arbiters arbitrate between requests to access its corresponding memory module 630. In addition, memory controller 270 includes memory controller 640 coupled to memory module 660 within memory 280. Similarly, memory controller 640 includes arbiter 650. According to one embodiment, each of the arbiters within memory controller 270 implements a round-robin arbitration scheme to facilitate the access of memory 280 resources.

Further, each memory controller 610 shares address lines with at least one other memory controller. For example, memory controllers 610(a) and 610(b) share a multiplexed address line in order to access the corresponding memory modules. Consequently, if memory controller 610(a) is to access memory module 630(a) the address line of memory controller 610(a) is selected, resulting in the address of memory module 630(a) being transmitted along with a chip select signal and data. The sharing of address lines by memory controllers 610 reduces the pin count necessary to address memory modules 630. One of ordinary skill in the art will appreciate that other quantities of memory controllers (e.g., 3, 4, etc.) may share the same address line.

As described above, memory 280 includes six memory modules 630. According to one embodiment, memory modules 630 are separate logical memories that are used to store packet data received at switch 110. In one embodiment, memory modules 630 are synchronous dynamic random access memories (SDRAMs). In addition, memory 280 includes memory module 660. Memory module 660 is used to store address lookup information accessed by ARL 240, as well as packet data. According to one embodiment, memory module 660 is a synchronous static random access memory (SSRAM). Nevertheless, one of ordinary skill in the art will appreciate that other types of memories may be used to implement memory modules 630 and memory module 660.

Figure 5:
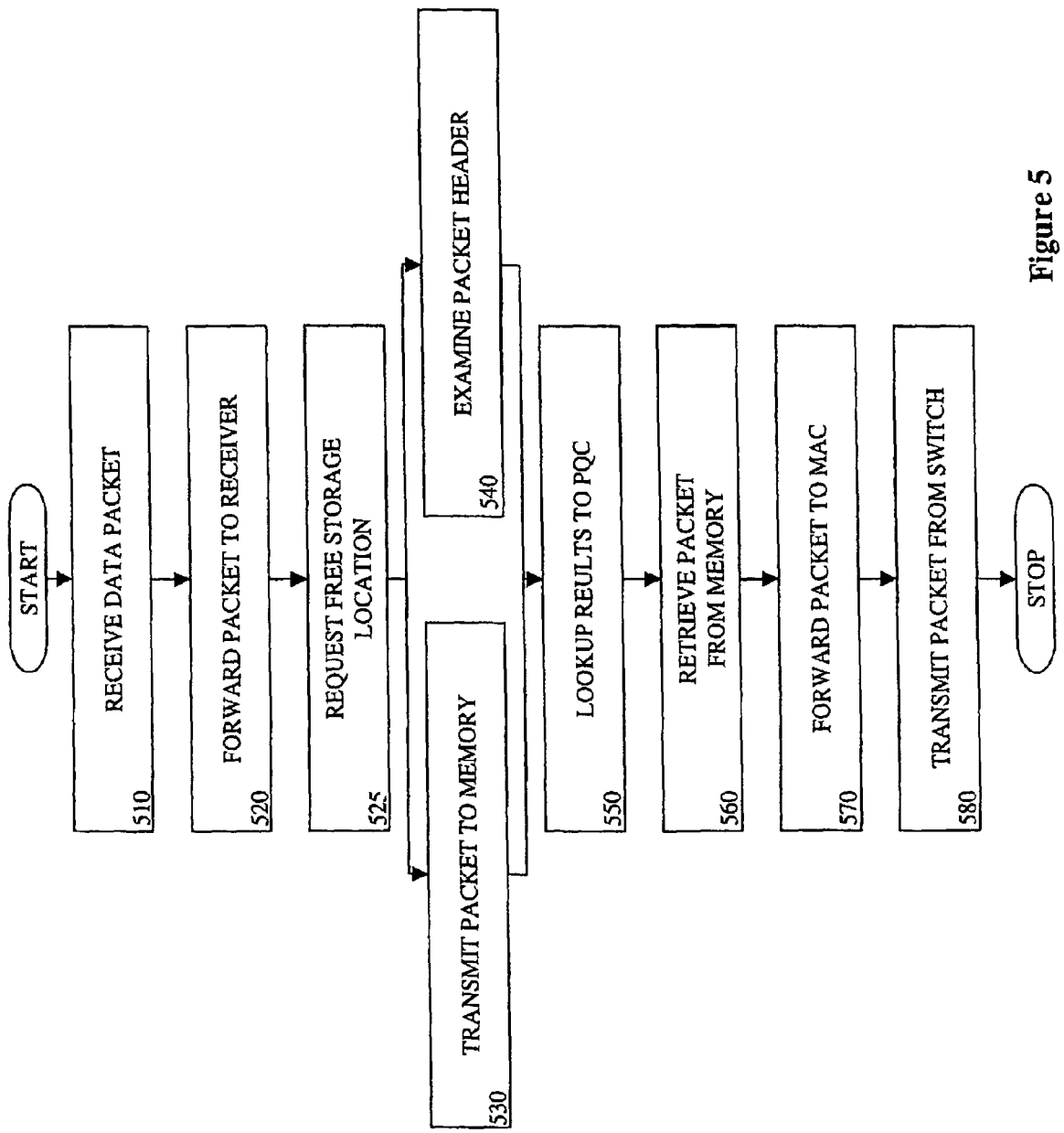
FIG. 5 is a flow diagram for one embodiment of the packet flow of a network switch.

FIG. 5 is a flow diagram for one embodiment of the packet flow for network switch 110. At process block 510, a data packet is received at MAC 210 or MAC 215 via one of the plurality of connected network ports. At process block 520, the data packet is forwarded to receiver 230. As described above, arbiter 350 within receiver 230 arbitrates between the network ports at MACs 210 and 215 in order to determine which port is to transmit packets to receiver 230. Therefore, the port at which the packet was received is granted access to receiver 230 before forwarding the packet. The data packet is stored at the FIFO corresponding to the MAC from which it was received. For example, a data packet received at a port associated with MAC 210 is forwarded to FIFO 310.

Once all of the previously received packets have been transmitted from the FIFO, a free storage address location in memory 280 is requested at PQC 240, process block 525. At process block 530, the data packet is transmitted to the memory 280 location designated by PQC 240 via memory controller 270. In addition, the header of the packet is examined at ARL 240, process block 540. As described above, ARL 240 accesses a lookup table in memory module 660 in order to determine the destination information (e.g., the output network port) for the packet. According to one embodiment, process blocks 530 and 540 are executed in parallel. However, in other embodiments, process block 530 may be executed prior to process block 540 or process block 540 may be executed prior to process block 530.

At process block 550, ARL 240 transmits the results from the lookup table to PQC 250. Subsequently, a pointer corresponding to the address location in which the packet is stored and destination port is buffered in queue 830 at the destination port storage location from which the packet is to be transmitted. The queuing of transmit requests will be described in further detail below. At process block 560, transmitter 235 retrieves the packet data, via memory controller 270, from the location in memory 280 at which the packet is stored. The data packet is stored at the FIFO corresponding to the MAC from which it was received. For example, a data packet to be transmitted from a port associated with MAC 220 is forwarded to FIFO 360.

At process block 570, the data packet is forwarded from transmitter 235 to the appropriate MAC. Arbiter 390 within transmitter 235 arbitrates between the FIFO buffers in order to determine which FIFO is granted access to transmit packets to the MACs. Therefore, the FIFO at which the packet was received is granted access to MAC 220 or GMAC 225 before forwarding the packet. At process block 580, the data packet is received from MAC 220 or GMAC 225 and transmitted over the plurality of appropriate network port.

Memory Management

Typical network switches access one logical memory in order to store packet data. As a result, only one set of address banks is accessed in order to store and retrieve packet data, even though multiple memories may be implemented for storage.

However, referring back to FIG. 6, network switch 110 described in the present invention writes packet data to memory 280 according to a divided access scheme. The divided access scheme includes the partitioning of data packets written to memory 280 among memory modules 630 from each receiving port. For example, data packets received at a port of MAC 210 are written sequentially to the six memory modules 630. Data packets received by switch 110 may vary between 64 Bytes (64 B) and 1518 B in length.

According to a further embodiment, the first 8 B of a data packet are stored in memory module 660. Subsequently, the remaining data of the packet is sequentially written in 32 B burst write segments to modules 630. 16 B bytes of the data are written into each of two memory banks within the memory module 630. Upon a subsequent memory write access by the same port, the process begins again except that the first 32 B segment of the packet is written beginning the next memory module 630 from which the last write was stored.

According to yet another embodiment, if the last burst segment of data written to a memory module 630 is less than or equal to 16 B (e.g., does not require the use of both memory banks), both banks are written with the same data. Duplicating and storing the last segment in both banks, when applicable, enables the data to be subsequently read from either bank. Therefore, read accesses may be optimized by reading data from one bank, while the other bank is currently being accessed.

Figure 7:
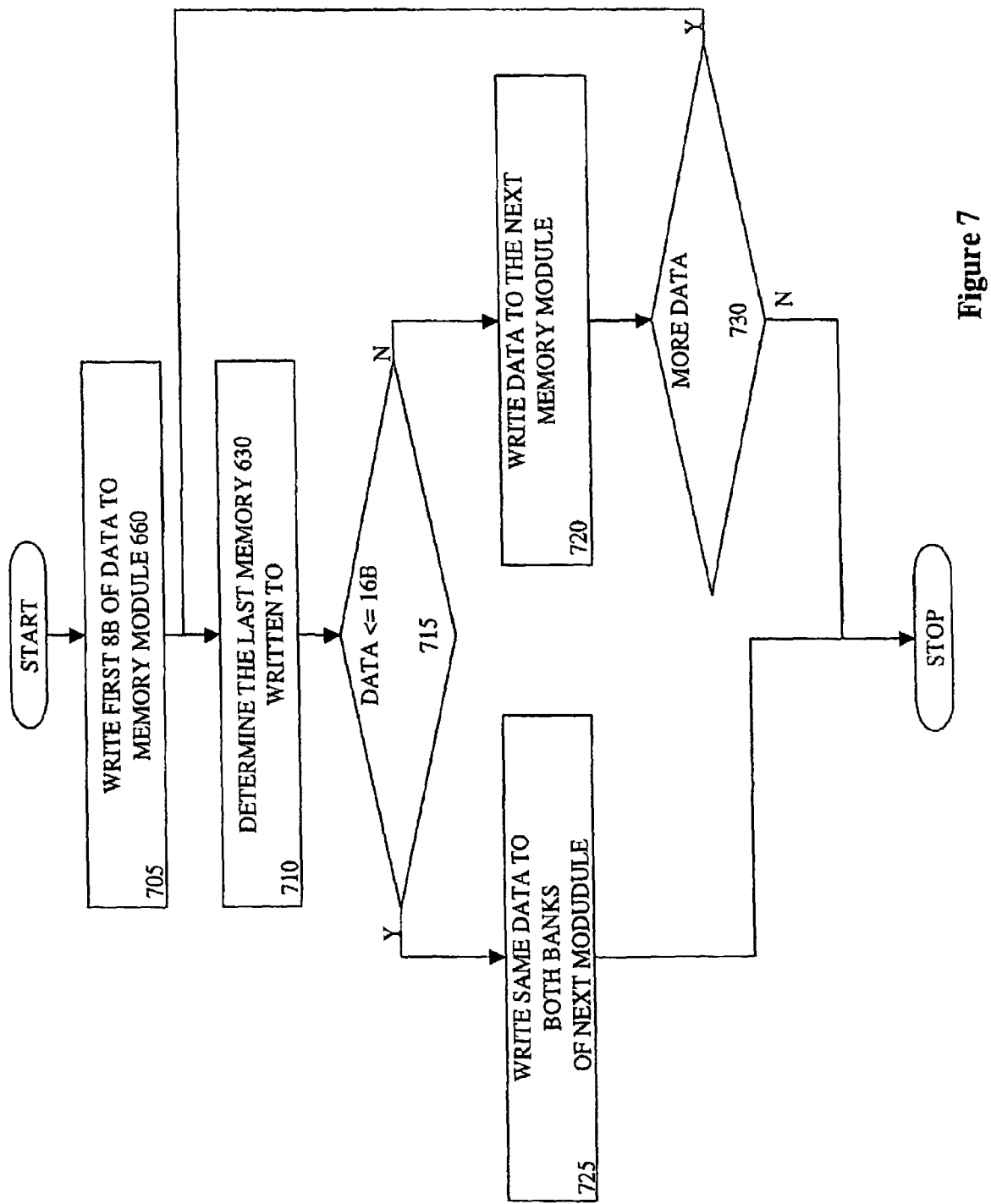
FIG. 7 is a flow diagram for one embodiment of a memory write access by a network switch port.

FIG. 7 is a flow diagram for one embodiment of memory write access by a single port received at network switch 110. At process block 705, the first 8 B of the data packet are stored in memory module 660. At process block 710, the latest memory module 630 accessed for a write command by the port is determined. According to one embodiment, memory controller 270 maintains a record of the most recent memory module 630 accessed by each input port. If the write access is the first by a particular port, the first module 630 is accessed by default. In another embodiment, memory controller 270 may maintain a record of the next module 630 to be accessed.

At process block 715, it is determined whether the data to be written to the next memory module is less than or equal to 16 B. If the data is less than or equal to 16 B, the data represents the last burst for the data packet. Thus, the data is duplicated and written to both banks of the next module 630, process block 725. If the data to be written is greater than 16 B, a normal burst of data to both banks is written to the next memory module 630 designated to be accessed, at process block 720.

At process block 730, it is determined whether more data is to be written to memory 280. If it is determined that more data is to be written to memory 280 for that particular port, control is returned to process block 710 where the last module 630 that data was written from the particular port is again determined. If no more data is to be written to memory 280, all of the packet data from the port has been written and the process is finished.

An example illustrating process blocks 705-730 will be described herein. Assuming that the port is accessing memory 280 for the first time for a 80 B data packet write access, the first 8 B of the data packet is written to memory module 660. Next, a 32 B portion of data is written to module 630(*a*). Subsequently, memory controller 270 is updated to reflect that the module 630(*a*) was last written to.

Thereafter, a second 32B of packet data is written to the module 630(*b*) after a determination by memory controller 270 and memory controller 270 is updated as described above. Afterward, the final 8B of the data packet is duplicated and written to both banks within module 630(*c*). Upon a subsequent write access to the memory by the same port, the process is the same beginning with writing to the module 360(*d*) after writing the first 8 B to memory module 660.

Queuing

Figure 9A:
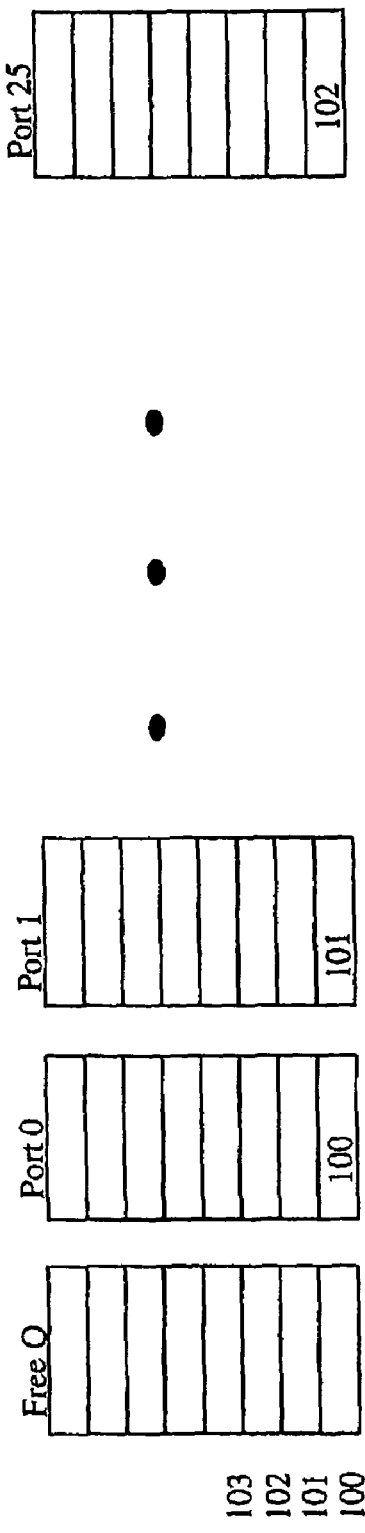
FIG. 9A illustrates a typical queuing system implemented in a network switch.

FIG. 9A illustrates a typical queuing system implemented in a network switch. According to one embodiment, the modules within memory 280 are partitioned into a predetermined number of buffer storage blocks for receiving packet data. The queuing system typically includes a free queue and a queue for each port. The free queue comprises of a list of address pointers corresponding to unused buffer storage blocks. The queue for each port stores pointers that reference packet buffer blocks that include packet data that is to be transmitted from the particular port.

A pointer to the memory location in which a packet of data is stored is placed in the queue for a particular port once it is determined that the packet is to be transmitted from the port. For example, once it is determined that the packet data stored in the address location associated with location 100 of the free queue is to be transmitted from port 0, the pointer corresponding with free queue location 100 is placed in the queue for port 0. Similarly, once it is determined that packet data stored in the address location associated with location 101 of the free queue is to be transmitted from port 1, the pointer corresponding with free queue location 101 is placed in the queue for port 1. However, buffering pointers in separate queues for each port requires a large amount of memory.

Figure 9B:
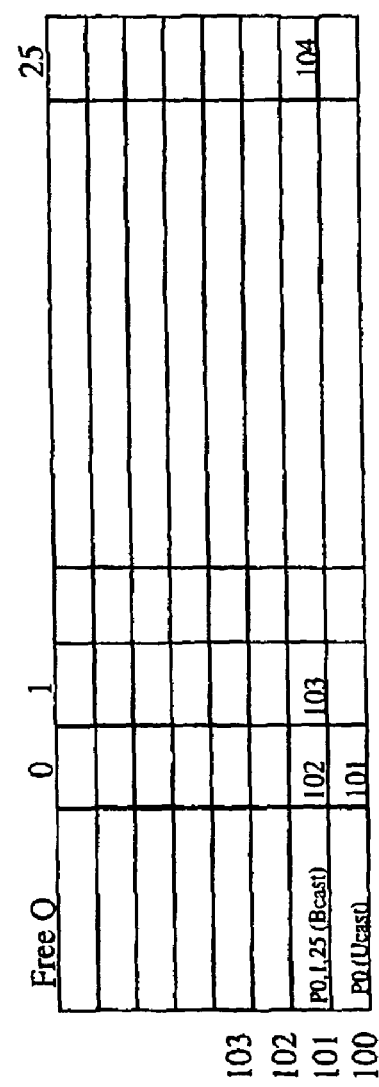
FIG. 9B illustrates another typical queuing system implemented in a network switch.

FIG. 9B illustrates a linked list type of queuing system that has been implemented in previous network switches. The function of the linked list queue is similar to that described above, but compressed into one linked list database. As described above, each storage location in a linked list queue corresponds to a free address in memory. The queue storage locations each include information regarding the port from which the packet data stored in the corresponding memory address is to be transmitted. In addition, the storage locations include a pointer to the next storage location (next pointer) corresponding to an unused address location in memory. For example, an entry in a location 100 indicates that the data stored at the associated memory address is to be transmitted from port 0, and that the next address in memory is an address corresponding to queue storage location 101.

However, in cases where a broadcast packet is received, it is necessary to also provide for multiple next pointers to free locations corresponding with all of the ports designated by the broadcast. For instance, an entry in a location 101 indicates that the data stored at the associated memory address is to be transmitted from ports 0, 1 and 25. Accordingly, the next addresses in memory are addresses corresponding to queue storage locations 102, 103 and 104 which will be transmitted from port 0, 1 and 25, respectively. Therefore, in the linked list queuing implementation, it is often necessary to provide space in each storage location for next pointers for each outgoing port coupled to the switch in order to provide for the possibility of a broadcast to all ports. As a result, a large amount of memory is required to provide for all of the potential next pointers listed in a broadcast packet.

Figure 10:
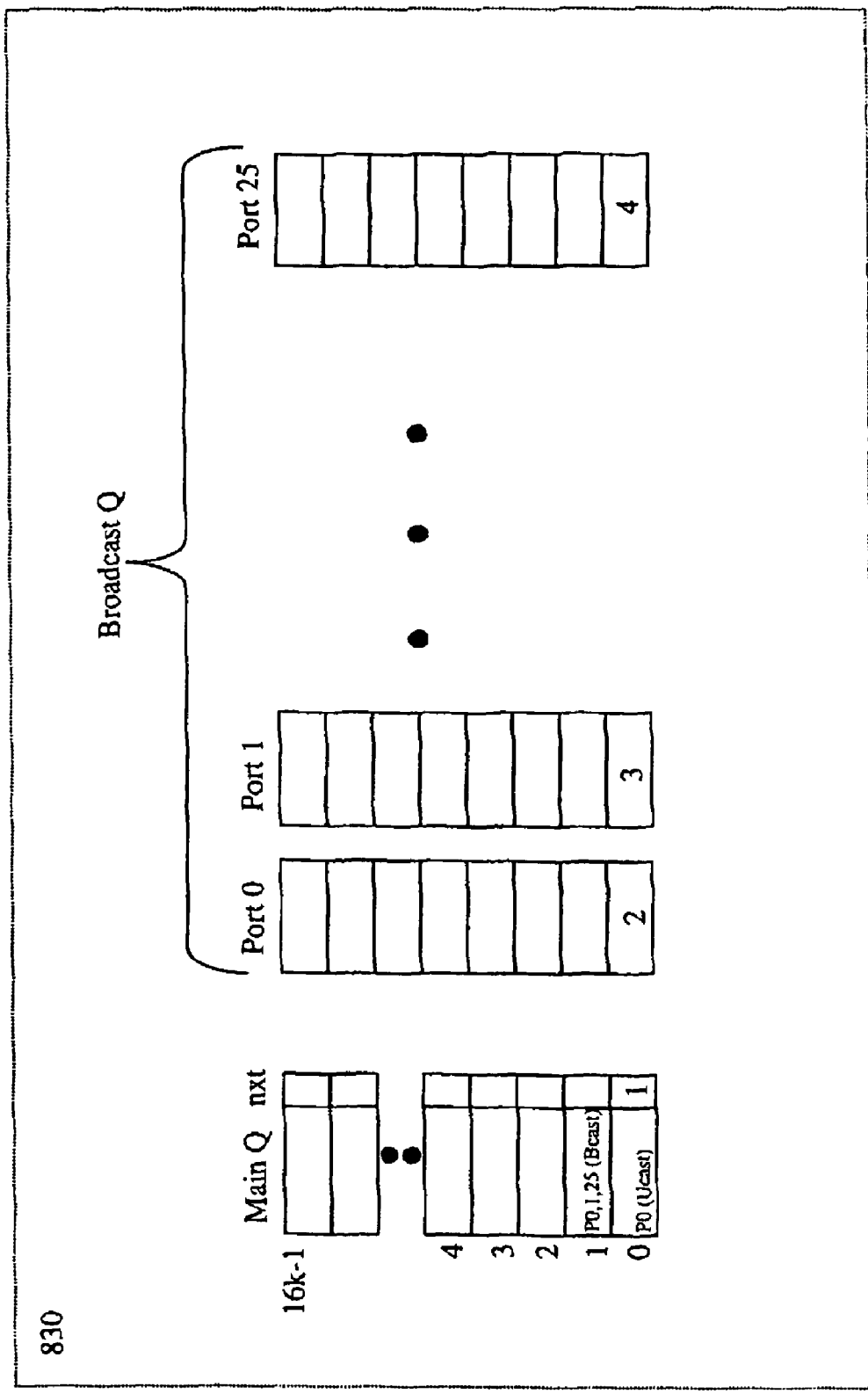
FIG. 10 illustrates one embodiment of a queue.

FIG. 10 illustrates one embodiment of queue 830. According to one embodiment, queue 830 includes a main queue and broadcast queues corresponding to each of the 26 ports coupled to switch 110. In one embodiment, each queue within queue 830 includes a number of storage locations corresponding to the size of memory modules 630. As shown in FIG. 10, each queue includes storage location starting at 0 and ending at 16K−1, thus coinciding to the size of a 16K packet memory. However, one of ordinary skill in the art will appreciate that other sizes may be used to implement queue 830.

After ARL 240 performs the lookup operation and ascertains the port from which a stored data packet is to be transmitted, the port number is stored in a storage location of the main queue corresponding to the address location in memory 280 at which the packet is stored. According to one embodiment, the main queue includes head and tail pointers for each connected port. The head and tail pointers keeps track of the storage locations in the queue that point to packet data in memory to be transmitted from a particular port.

The head pointer for a port (e.g., port 0) points to the location in the main queue that contains a pointer to a packet that is to be the next transmitted from the port. Once the packet corresponding to the location in the main queue is transmitted from the port, the head pointer is shifted to the next location in the main queue pointing to a packet to be transmitted from the port. The tail pointer for a port points to storage location in the main queue that contains a pointer to a packet that is currently the last to be transmitted from the port. The tail pointer typically points to the most recently received packet for the port. Upon receipt of subsequent packets destined for transmission from the port, the tail pointer moves to the new location corresponding to the packet.

According to one embodiment, each storage location in the main queue includes information regarding the port from which the packet data stored in the corresponding memory location is to be transmitted and next pointer. The next pointer is stored in the main queue during the servicing of unicast packets. For example, if a unicast packet to be transmitted through port 0 is received and assigned to storage location 0, the next pointer 1 is stored in the main queue. The next pointer 1 indicates that the memory address corresponding to location 1 is the next location to handle the transmission from port 0.

As described above, queue 830 also includes broadcast queues corresponding to each port coupled to switch 110. According to one embodiment, the broadcast queues store next pointers for the main queue upon receipt of a broadcast packet. For example, if a broadcast packet to be transmitted through ports 0, 1 and 25 is received and assigned to storage location 1, the next pointer 2 is stored in the broadcast queue corresponding to port 0. The next pointer 2 indicates that the memory address corresponding to location 2 is the next free location to handle the transmission from port 0. Similarly, the next pointers 3 and 4 are stored in broadcast queues corresponding to ports 1 and 25, respectively, after the broadcast in location 1.

The use of broadcast queues for storage of next pointers for broadcast packet provides an efficient use of memory. Since broadcast packets typically comprise less than 20% of the total packet traffic received at switch 110, the size of the broadcast queue may be reduced to a relatively small size. Therefore, the amount of memory needed to implement the queuing system disclosed in the present invention is substantially less than the memory size required in conventional queuing systems (e.g., FIGS. 9A and 9B).

Traffic Control

According to one embodiment, switch 110 includes a traffic control feature that helps to prevent the loss of received data packets. As described above, control logic 340 (FIG. 3) within receiver 230 transmits signals to PQC 250 to whenever data is received from a port. The signals indicate that a packet has been received via a particular port. Counters 810 within PQC 250 increment various counts in response to receiving the signals. The count correlates to the number of pending data packets within MACs 210 and 215 from each port. In addition, counters 810 decrement the count as the packets are transmitted from switch 110. According to one embodiment, PQC 250 maintains a separate accounting for each individual port. For example, 26 counters are included for an embodiment in which 24 ports are coupled to MAC 210 and 2 coupled to MAC 215.

Figure 11:
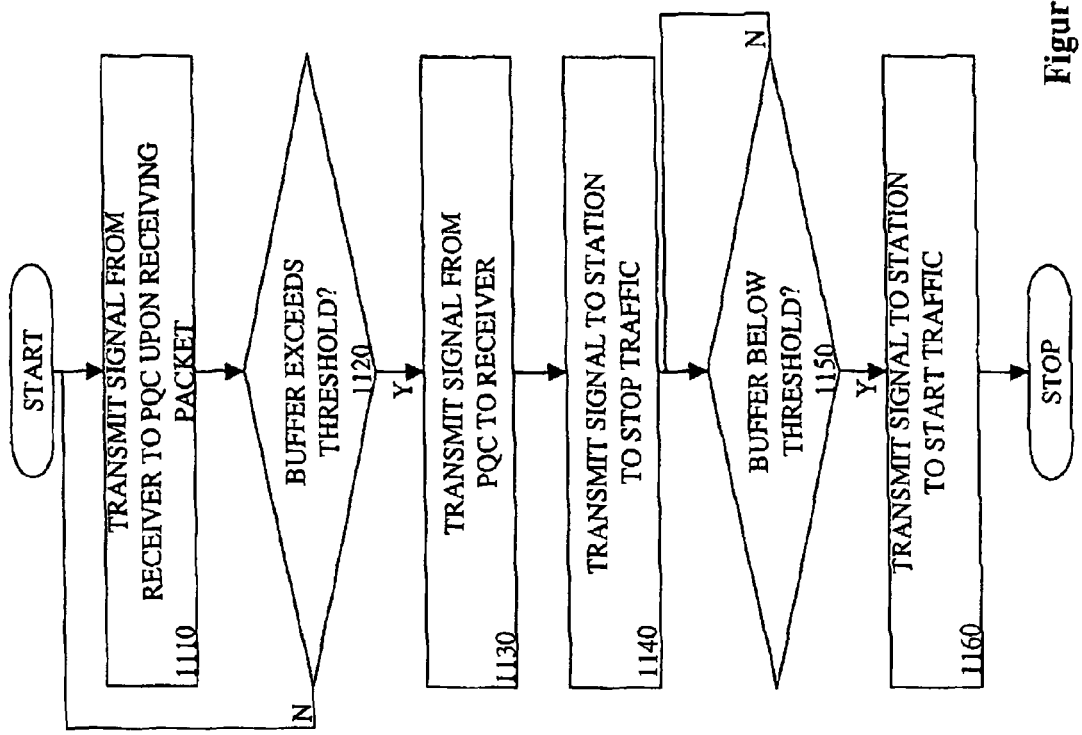
FIG. 11 is a flow diagram for one embodiment of traffic flow control by a network switch port.

FIG. 11 is a flow diagram for one embodiment of traffic flow control at a port received by network switch 110. At process block 1110, a signal is transmitted from control logic 340 to counters 810 indicating that receiver 230 has received a data packet from a particular port coupled to MAC 210 or MAC 215. The packet is received into a FIFO buffer associated with the receiving port. At process block 1120, it is determined at control logic 820 within PQC 250 whether the number of packets currently residing in FIFO buffer allocated for the port exceeds a predetermined threshold value. If the number of data packets stored in the buffer does not exceed the threshold value, the data receive rate at switch 110 is appropriate and control is returned to process block 1110 where another packet is received.

If however, the number of data packets stored in the buffer exceeds the threshold value, control logic 820 transmits a signal to control logic 340 within receiver 230 indicating the data receiving rate at receiver 230 should be slowed down, process block 1130. At process block 1140, another signal is transmitted from switch 110 to the station 120 coupled to the port prohibiting the station from transmitting further data on the port until further notice.

At process block 1150, it is determined whether the number of packets stored in the buffer has fallen below the predetermined threshold value in order to commence receiving data at the associated port. As described above, counters 810 are decremented each time a packet is transmitted from the associated FIFO buffer to memory 280. If the number of packets within the buffer is not sufficiently low, control is returned to process block 1150.

Once the number of packets stored in the buffer falls below the predetermined threshold, switch 110 transmits another signal to the station 120 coupled to the port commanding the station to commence transmitting traffic at process block 1160. According to one embodiment, the threshold needed to begin receiving traffic at the port is a lower value than the value for stopping packet traffic flow in order to prevent a subsequent stopping of traffic immediately after receiving the next packet.

Address Lookup

Figure 12:
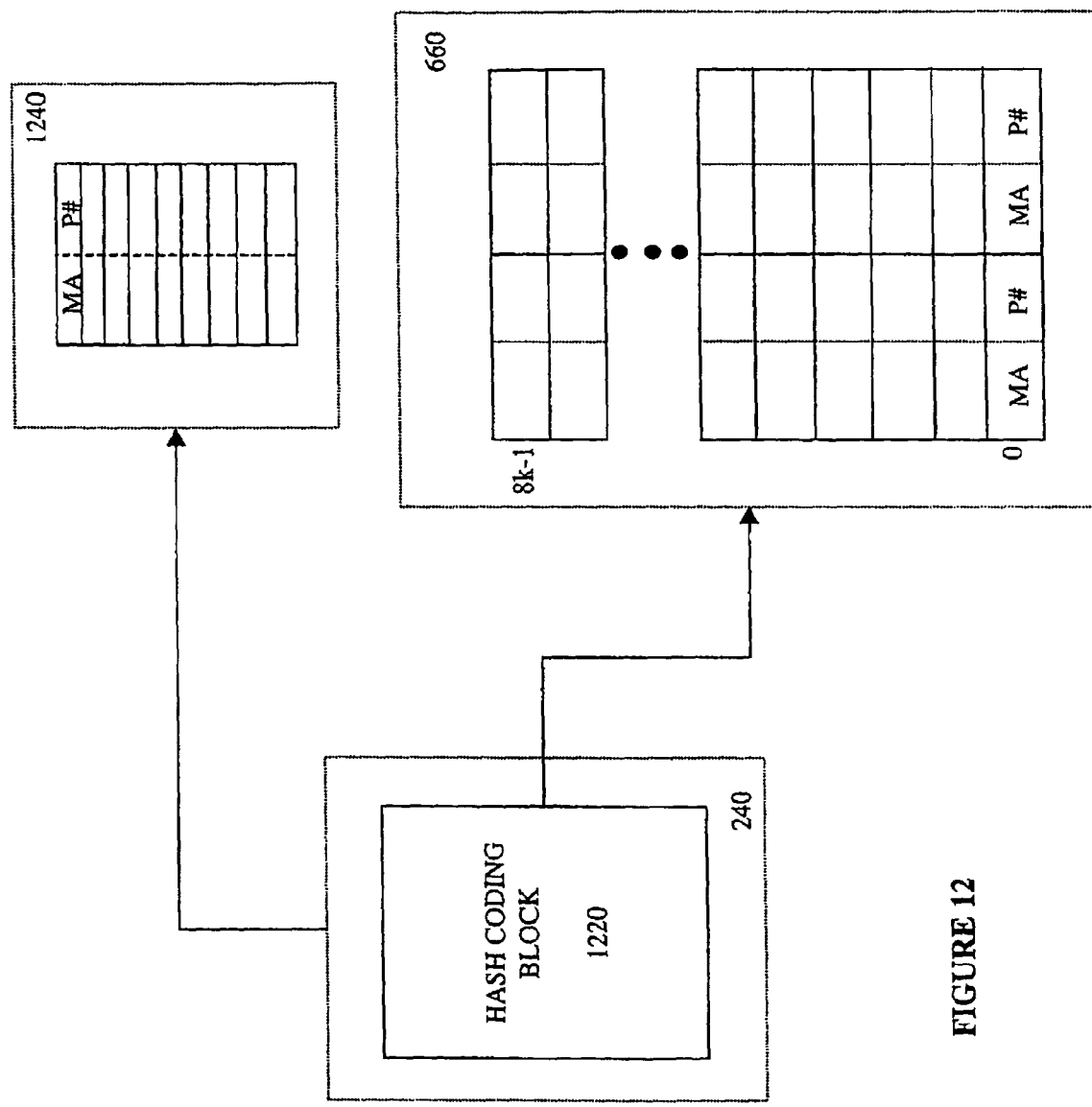
FIG. 12 is a block diagram of one embodiment of address resolution logic coupled to a memory and cache.

FIG. 12 is a block diagram of one embodiment of ARL 240 coupled to memory module 660 and a cache 1240. As described above, ARL 240 maps the incoming port and address information received to an outgoing port and address using a lookup table stored in memory module 660. According to one embodiment, ARL 240 includes hash-coding block 1220. Hash coding block 1220 provides a compressed representation of address information (e.g., MAC address) that allows a lookup table within memory module 660 to be much smaller than the maximum number of possible address combinations.

According to one embodiment, hash coding block 1220 compresses a 48-bit destination address into a 13-bit (8K) address. In one embodiment, the hash coding extracts the thirteen least significant bits of each 48-bit address for storage in memory module 660. Thus, hash coding reduces the time needed to search a lookup table by reducing the size of the table. One of ordinary skill in the art will appreciate that other hash coding methods may be used.

As described above, memory module 660 includes a lookup table used by ARL 240 to map received address information to an outgoing port. According to one embodiment, the lookup table stores address entries from 0 to 8K−1. In addition, each 13-bit address location has 2 bucket storage locations (buckets) in order to store 2 addresses. In a further embodiment, each of the buckets store the address and the output port number associated with the port. Thus, the address lookup table effectively stores 16K of addresses.

According to one embodiment, as the addresses are received, they are stored in a bucket at an address location corresponding to the 13-bit address. However, since 48-bit addresses are converted to 13 bits there are often address collisions. A collision occurs whenever multiple 48-bit addresses are converted to the same 13-bit address. If there is a collision between two 13-bit addresses, the second address received is stored in the second bucket corresponding with the address. However, if there is a collision with three or more 13-bit addresses, the full 48 bits of the additional addresses (e.g., in excess of 2) are stored in cache 1240.

Cache 1240 is a secondary lookup table for ARL 240. According to one embodiment cache 1240 includes 16 storage locations for storing collision addresses. Similar, to the lookup table buckets, each of the 16 entries in cache 1240 stores the address and the output port number associated with the port. According to one embodiment, cache 1240 is included within switch 110. However, in other embodiments, cache 1240 may be placed in other locations (e.g., within memory 280).

Figure 13:
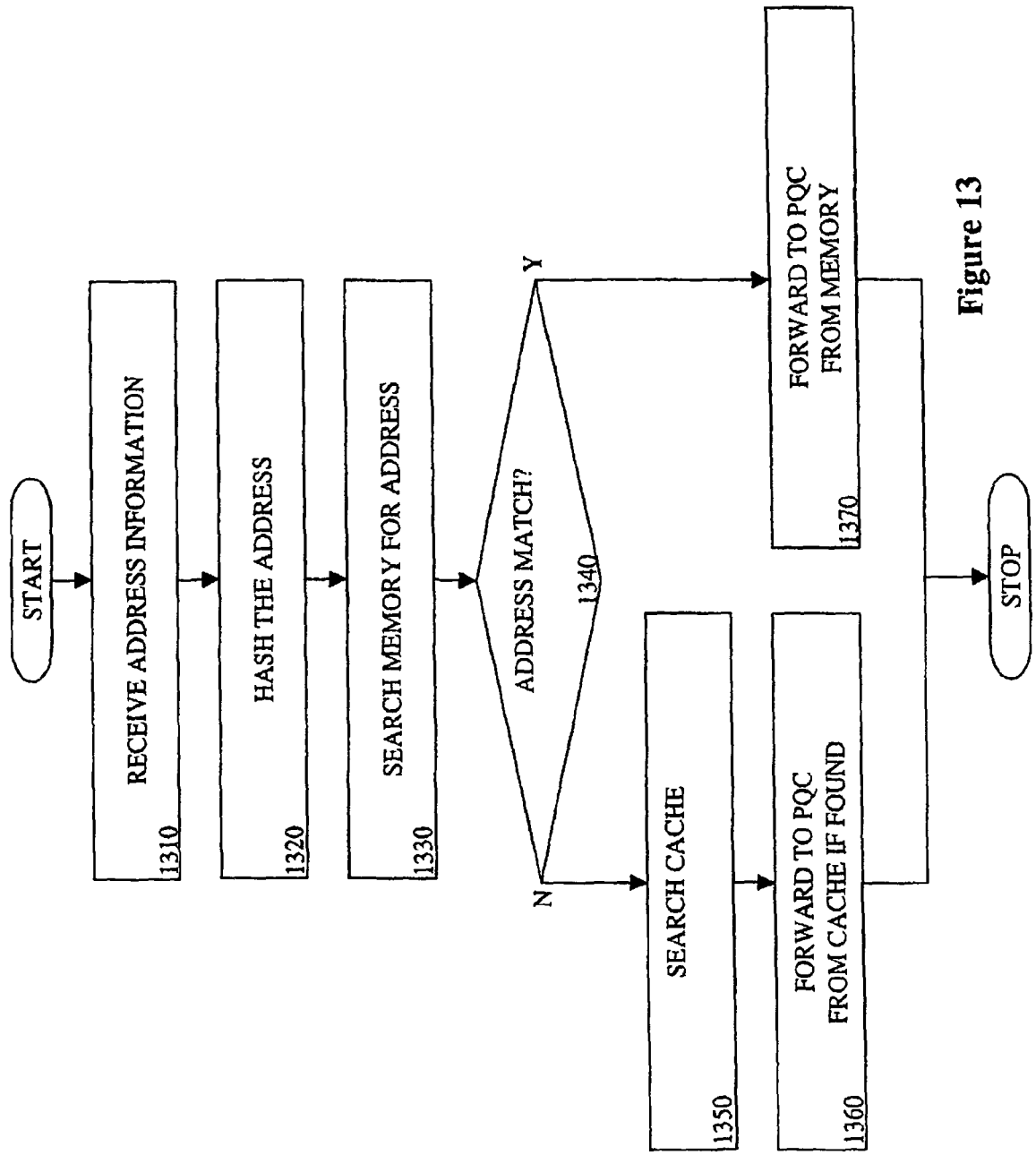
FIG. 13 is a flow diagram for one embodiment for an address lookup operation.

FIG. 13 is a flow diagram of one embodiment for the address lookup operation of ARL 240. At process block 1310, address information from a data packet header is received at ARL 240. At process block 1320, the 48-bit destination address is hashed into a 13-bit address. At process block 1330, the address lookup table in memory module 660 is searched in order to find the port information for the received address. According to one embodiment, the received 13-bit address is compared to the two bucket locations in the address lookup table corresponding with that address. At process block 1340, it is determined whether the addresses in either of the buckets in the address lookup table match the received address.

If no match occurs, the full 48 bits of the received address is compared to the 16 address entries stored in cache 1240, process block 1350. At process block 1360, the outgoing port information is forwarded to PQC 250 from cache 1240 if it is found. If a match occurs, the outgoing address information is forwarded to PQC 250 from memory module 660, process block 1370. Having to search for a 13-bit lookup address expedites the address lookup process at ARL 240.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A method comprising:
    a) receiving a data packet at an input buffer of a receiver, the input buffer associated with a first port;
    b) determining whether a number of data packets received at the input buffer of the receiver from the first port that are waiting to be switched to an output buffer of a network switch exceed a predetermined threshold, wherein the determining is performed by transmitting a second signal from the receiver to a packet queuing control (PQC); and determining at the PQC, based on the second signal, whether the number of data packets or an equivalent amount of data of the data packets received at the receiver from the first port that are waiting to be switched to an output buffer of the network switch exceed a predetermined threshold;
    c) based on determining that a number of data packets received at the input buffer of the receiver from the first port that are waiting to be switched to an output buffer of the network switch exceed a predetermined threshold, transmitting a first signal from the network switch to a station coupled to the network switch directing the station to terminate the transmission of data packets to the network switch; and
    d) transmitting an additional signal to the receiver if the number of data packets received at the receiver from the first port that are waiting to be switched to an output buffer of the network switch exceed the predetermined threshold, wherein the additional signal indicates that the data receive rate of the first port should be reduced.

2. The method of claim 1, further comprising: transmitting the additional signal as a third signal from the PQC to the receiver.

3. The method of claim 1 further comprising receiving a second data packet at the input buffer associated with the first port if the number of data packets received at the receiver from the first port that are waiting to be switched to an output buffer of the network switch do not exceed the predetermined threshold.

4. The method of claim 1 further comprising:
transferring at least a portion of the data packet to an output buffer associated with a select output port.

5. The method of claim 1 further comprising:
maintaining a count, for each input port, of a number of data packets received at a corresponding input buffer are waiting to be switched to an output port of the network switch.

6. A network switch comprising: a media access controller (MAC) coupled to a plurality of ports; a receiver coupled to the MAC; and packet queuing control (PQC) coupled to the receiver, wherein the PQC is configured to maintain a count of the number of receive packets or an equivalent amount of data of the receive packets stored in the receiver in each of a plurality of input buffers, each input buffer associated with one of the plurality of ports coupled to the MAC; at least one output buffer operably connected to the input buffers; a transmitter that transmits a termination signal from the network switch to a station coupled to the network switch directing the station to terminate the transmission of data packets to the network switch if the count in the PQC exceeds a predetermined threshold; and wherein the PQC transmits an additional signal to the receiver if the number or the amount of data packets received at the receiver from the first port that are waiting to be switched to an output buffer of the network switch exceed the predetermined threshold, wherein the additional signal indicates that the data receive rate of the first port should be reduced.

7. The network switch of claim 6 wherein the receiver comprises: receiver control logic; and wherein the predetermined threshold for each input buffer corresponds to the size of the input buffer.

8. The network switch of claim 7 wherein the receiver control logic is configured to transmit a control signal to the PQC upon receiving packet data at a port.

9. The network switch of claim 6 wherein the PQC comprises: PQC control logic; and a plurality of counters corresponding to the plurality of input buffers, wherein each of the plurality of counters maintains a count of the number of data packets within a corresponding input buffer.

10. The network switch of claim 9 wherein each of the plurality of counters increments a count upon the corresponding input buffer receiving a data packet and decrements the count upon the corresponding input buffer forwarding a data packet to an output buffer.

11. The network switch of claim 8 wherein the PQC control logic is configured to transmit a control signal to the receiver upon the count of one or more of the counters exceeding a predetermined threshold.

12. The network switch of claim 11 wherein the transmitter is configured to transmit the termination signal to a network station coupled to the network switch directing the network station to discontinue the transmission of data packets to the network switch.

13. The network switch of claim 11 wherein the PQC control logic is further configured to transmit the additional signal to the receiver upon the count of one or more of the counters falling below the predetermined threshold.

14. The network switch of claim 13 wherein the transmitter is configured to transmit another state of the termination signal or a different, separate signal to a network station coupled to the network switch directing the network station to continue the transmission of data packets to the network switch.

15. An arrangement for use in a network switch, comprising: a receiver that receives a data packet at an input buffer of a receiver, the input buffer associated with a first port; and a determination unit that determines whether a number of data packets or an equivalent amount of data of the data packets received at the receiver from the first port that are waiting to be switched to an output buffer of the network switch exceed a predetermined threshold; wherein the determination unit is configured to generate a first signal and transmit the first signal from the network switch to a station coupled to the network switch directing the station to terminate the transmission of data packets to the network switch if the number of data packets received at the receiver from the first port that are waiting to be switched to an output buffer of the network switch exceed a predetermined threshold; and a packet queuing control (PQC) configured to receive a second signal from the receiver, the PQC comprising a determination unit configured to, based on the second signal, determine whether the number of data packets received at the receiver from the first port that are waiting to be switched to an output buffer of the network switch exceed a predetermined threshold, wherein the PQC determination unit is configured to generate an additional signal and transmit the additional signal to the receiver if the number of data packets received at the receiver from the first port that are waiting to be switched to an output buffer of the network switch exceed the predetermined threshold, wherein the additional signal indicates that the data receive rate of the first port should be reduced.

16. The arrangement of claim 15, wherein the additional signal is transmitted as a third signal from the PQC to the receiver if the number of data packets received at the receiver from the first port that are waiting to be switched to an output buffer of the network switch exceed the predetermined threshold, wherein the additional signal indicates that the data receive rate of the first port should be reduced.

17. The arrangement of claim 15, further comprising a second data packet at the input buffer of the receiver associated with the first port if the number of data packets received at the receiver from the first port that are waiting to be switched to an output buffer of the network switch do not exceed the predetermined threshold.

* * * * *